United States Patent
Stefansky et al.

[19]

[11] Patent Number: 6,166,890
[45] Date of Patent: Dec. 26, 2000

[54] IN PLANE, PUSH-PULL PARALLEL FORCE MICROACTUATOR

[75] Inventors: Frederick Mark Stefansky, Longmont; Rishi Kant, Boulder, both of Colo.

[73] Assignee: Seagate Technology LLC

[21] Appl. No.: 09/210,914

[22] Filed: Dec. 14, 1998

Related U.S. Application Data

[60] Provisional application No. 60/094,077, Jul. 24, 1998.

[51] Int. Cl.[7] .................................................... G11B 5/55
[52] U.S. Cl. ....................................................... 360/294.4
[58] Field of Search ................................. 360/103, 104, 360/106, 109, 294.1, 294.2, 294.3, 294.4

[56] References Cited

U.S. PATENT DOCUMENTS

| | | | |
|---|---|---|---|
| 5,084,791 | 1/1992 | Thanos et al. | 360/77.04 |
| 5,400,192 | 3/1995 | Mizoshita et al. | 360/77.16 |
| 5,675,459 | 10/1997 | Sato et al. | 360/113 |
| 5,703,740 | 12/1997 | Cohen et al. | 360/126 |
| 5,745,319 | 4/1998 | Takekado et al. | 360/78.05 |
| 5,751,510 | 5/1998 | Smith et al. | 360/67 |
| 5,753,803 | 5/1998 | Omessi | 426/483 |
| 5,772,493 | 6/1998 | Rottmayer et al. | 451/5 |
| 5,790,334 | 8/1998 | Cunningham | 360/66 |
| 5,793,279 | 8/1998 | Nepela | 338/32 R |
| 5,796,560 | 8/1998 | Saito et al. | 360/113 |
| 5,914,507 | 6/1999 | Polla et al. | 257/254 |
| 5,936,805 | 8/1999 | Imaino | 360/104 |
| 5,959,808 | 9/1999 | Fan et al. | 360/106 |
| 6,002,549 | 12/1999 | Berman et al. | 360/104 |
| 6,038,104 | 3/2000 | Sato et al. | 360/106 |
| 6,046,888 | 4/2000 | Krinke et al. | 360/104 |

FOREIGN PATENT DOCUMENTS

| | | |
|---|---|---|
| 7-296537 | 11/1995 | Japan . |
| 2337848 | 10/1998 | United Kingdom . |

OTHER PUBLICATIONS

"Beyond", History of Firsts, http://www.storage.ibm.com/storage/firsts/nbeyondt.htm, Sep. 8, 1998.

D. Kuo, J. Gui, B. Marchon, S. Lee, I. Boszomenyi, J. Liu, G. Rauch, S. Vierk and D. Meyer, "Design of Laser Zone Texture for Low Glide Media", *IEEE Transactions on Magnetics*, vol. 32, No. 5, pp. 3753–3757, 1996.

J. McAllister, "Disk Flutter : Causes and Potiential Cures," *Data Storage*, pp. 29–34, May/Jun. 1997.

D.J. Peretite, and K.J. Van Heel, "Disk Flutter Issues at 10,000 RPMS and Beyond," *IDEMA Insight*, pp. 3–13, Jan./Feb. 1998.

*Primary Examiner*—Jefferson Evans
*Attorney, Agent, or Firm*—Clifford Chance Rogers & Wells LLP; Victor Siber, Esq.

[57] ABSTRACT

A method and apparatus for providing cross track positioning of a disk drive head relative to a formatted track on a disk platter. A load beam is attached via a living hinge to a cradle. Piezo crystals are mounted on the cradle in plane with the load beam. The crystals are attached to levers formed into a proximal end of the load beam and activated with electric signals from a microactuator control to elongate or contract. Activated simultaneously the crystals exert a push force on one lever and a pull force on the other lever causing the load beam to pivot about the living hinge acting as a fulcrum. The load beam is attached to the cradle via cradle panels located at the distal end portion of the load beam. The cradle panels are preferably perpendicular to the load beam thereby providing low resistance in the cross rack direction and support in the vertical direction.

20 Claims, 5 Drawing Sheets

IN PLANE, PUSH-PULL PARALLEL FORCE MICROACTUATOR

This appln claims the benefit of U.S. Provisional No. 60/094,077 filed Jul. 24, 1998.

BACKGROUND OF THE INVENTION

Magnetic disk drives are information storage devices that use thin film magnetic media to store data. A typical disk drive as illustrated in FIG. 7 includes one or more rotatable disks 16 having concentric data tracks wherein data is read or written. Sectors are written into the disk to dissect the tracks in a spoke pattern. As a disk rotates, a transducer, also referred to as a magnetic recording head, is supported by a slider and positioned by an actuator to magnetically read data from or write data to various tracks on the disk. Typically, a transducer is attached to a slider having an air-bearing surface which is supported adjacent to a data surface comprising the data tracks by a cushion of air generated by the rotating disk. Wires typically connect the transducer on the slider to a data processing unit that controls read/write electronic circuitry.

It is known to have an actuator arm 24 comprising a slider 5 to be attached on a side opposite the air-bearing surface of a load beam 3. A pivot motor 20, which is controlled by a servo control system, rotates the actuator arm to position the magnetic head over a desired data track on the magnetic disk. A load or force is typically applied against the slider by the load beam thereby biasing the heads toward the magnetic disk so as to move the heads closer to the magnetic disk. This force is compensated for by a cushion of air between the slider air bearing surface and the rotating disk.

In current disk drives servo information is written on sectors on each disk. Typically, a disk is divided into 80 sectors. A servo burst containing read-only servo encoded position information is embedded where a sector intersects a track. While reading or writing data on a track the head passes over the servo bursts and depending upon the location of the read/write head in relation to the servo burst a signal may be generated to bring the head into alignment with the track. The burst signal actuates the pivot motor. If the read/write head is properly aligned with the servo burst, no signal is generated. This type of servo is referred to as an embedded servo or sector servo.

During operation a relative position of the head may be displaced minutely due to heat generated in the disk drive or a change in ambient temperature. This minute displacement can cause the magnetic recording heads to be positioned off the signal tracks designated by the servo-positioning head. Mispositioning can cause delay, carried to an extreme mispositioning can cause errors in reading the data or writing signals to the magnetic disk drive. In order to correct a displacement of the read/write head, power must be applied to the servo actuator. An amount of displacement to be corrected is on the magnitude of micrometers. It is difficult to move a head by this small amount accurately by controlling the power of the servo actuator. Therefore, the conventional magnetic heads supporting mechanism is not suitable to meet recent requirements of high-density recording. In addition, in the case where the writing or reading operation is carried out while switching a plurality of data heads sequentially in a data region allotted by a cylinder, the position of the data head needs to be corrected each time the data head is switched. Switching prevents a continuous writing or reading operation from being carried out. This necessitates a waiting time of about 10 to 15 microseconds in order to turn the recording disk until a target sector aligns again thereby lowering a throughput. In order to address these problems of individual data head alignment, microactuators have been useful in aligning each data head over an appropriate data track.

Microactuator designs are known to utilize piezo elements mounted on panels to provide cross track motion to a read/write gap by bending in a plane FIG. 1. Typically, two piezo elements are mounted in parallel and perpendicular to the plane of a load beam. As the piezo crystals are activated, they contract or elongate in unison bending the elements. FIG. 4. The elongation or contraction causes a beam like element to move as the elements bend. Such configurations are particularly attractive since the bending energy provides sufficient cross track motion with a piezo driven microelectronic machine (MEM) juxtaposed to the slider. The panels are designed to flex in a direction that coincides with the motion of a read/write element as it seeks from track to track. In addition, these panels provide structural stiffness.

The bending of the piezo crystals provides cross track motion to a slider that is attached via rigid links to these panels at the antinodes. Thus, during bending the slider moves by an amount that is equal to an amount of bending reflection in the piezo crystals. A piezo crystal so mounted has the benefit of providing additional pitch and torsional stiffness. Also, the piezo crystals can be mounted on a thin sheet of stainless steel to provide reinforcement to the piezo crystals. Juxtaposition of the MEM and slider is highly desirable to dynamically de-couple the microactuator from the load beam. These concepts utilizing bending are efficient and reliable, however, the physical size of the design limits the use of known MEM microactuators with vertical mounted piezo crystals to disk drives with sufficient space to house a larger disk drive. This constraint limits their usefulness to desktop sized products or larger systems. A need still exists for microactuator designed suitable for use in smaller disk drives such as those used with smaller spacing between the disks.

In addition a microactuator located away from the slider has associated with it some performance penalties. When a microactuator MEM is mounted very close to the mounting plate of the suspension and in some cases becomes an integral part of the mounting plate away from the slider, dynamic signatures of the microactuator and the main actuator are not easily distinguishable from one another. Therefore, it is difficult to control these two mechanisms independently.

A further drawback of the earlier designs includes torsional modes of a load beam that can give rise to off track motion. In addition, gain associated with the first sway mode can be unexpectedly high, in the range of 22 dB for a sway frequency of 5 Khz and to 35 dB for a sway frequency of 9 Khz. Such high gains make clipping of such frequencies necessary.

Present needs for a disk drive require a microactuator design wherein the decay rate of the asymptote must be less than 20 dB per decade with a safety margin of 5 dB required. Further, a cross over frequency must not be less than 1.6 Khz. A high gain may be clipped or notched out if the location of resonant peaks does not vary significantly, however, often this is the not situation. Natural frequencies can shift from assembly to assembly making the task of notching or clipping almost impossible.

Consequently, there is a need to provide a microactuator capable of meeting these electrical requirements and also the physical size requirements for today's smaller hard drives.

SUMMARY OF THE INVENTION

Accordingly, this invention provides a method and apparatus for cross track positioning of a transducer for reading data off of a platter. In one embodiment, the transducer comprises a magnetic read/write head reading data from a disk drive platter. This invention utilizes a microactuator mechanism comprising a transducer mounted on a slider and supported by a beam like element with improved physical requirements. The extension and compression elastic energies of piezo crystals mounted in plane with a beam like element supporting the slider are used to cause cross track motion. In addition this invention provides a microactuator mechanism design wherein the decay rate of the asymptote, as the asymptote approaches infinity, is less than 20 dB per decade and the cross over frequency is not less than 1.6 KHz. Piezo crystals forming a microelectronic machine (MEM) are mounted very close to a slider allowing control of the cross track motion by making fine adjustments in the position of a read/write element.

In a preferred embodiment of this invention FIG. 5, a Walleye design microactuator 1, utilizes two piezo crystals 6 mounted on a cradle 2. The piezo crystals are mounted in a plane that is parallel or close to parallel to a beam like element resulting in a piezo crystal microelectronic machine with a low profile. A beam like element 26 supports a slider 5 onto which a transducer can be mounted. In the present invention one piezo crystal can be contracted simultaneous to the other crystal becoming elongated. The contracting crystal exerts a pull on the beam like element while at the same time the elongating crystal exerts a push on the beam like element. The force of the push-pull causes the beam like element to pivot at a fulcrum point formed by a living hinge 4. The pivoting produces a cross track motion of the transducer that is useful in aligning the transducer over a track of a magnetic media comprising a disk drive. Thus, during elongation and contraction the slider moves by an amount that is equal to the amount of deflection in the piezo crystals. By controlling cross track motion with the piezo crystals, this invention is able to make fine adjustments in the position of a read/write element.

DETAILED DESCRIPTION OF THE INVENTION

The teachings of the present invention are applicable to many different types of disk drive actuators and may be used for instance in actuators of different sizes and shapes. As will be appreciated by those of ordinary skill in the art, while the following discussion sets forth various preferred embodiments of a microactuator, these implementations are not meant to be restrictive of the appended claims, nor are they intended to imply that the claimed invention has limited applicability to one type of disk drive. The teachings discussed below are applicable to many different types, and sizes of disk drives. In the following detailed description of the preferred embodiments, reference is made to the accompanying drawings which form a part hereof and in which is shown by way of illustration specific embodiments in which the invention may be practiced.

Figure 8:
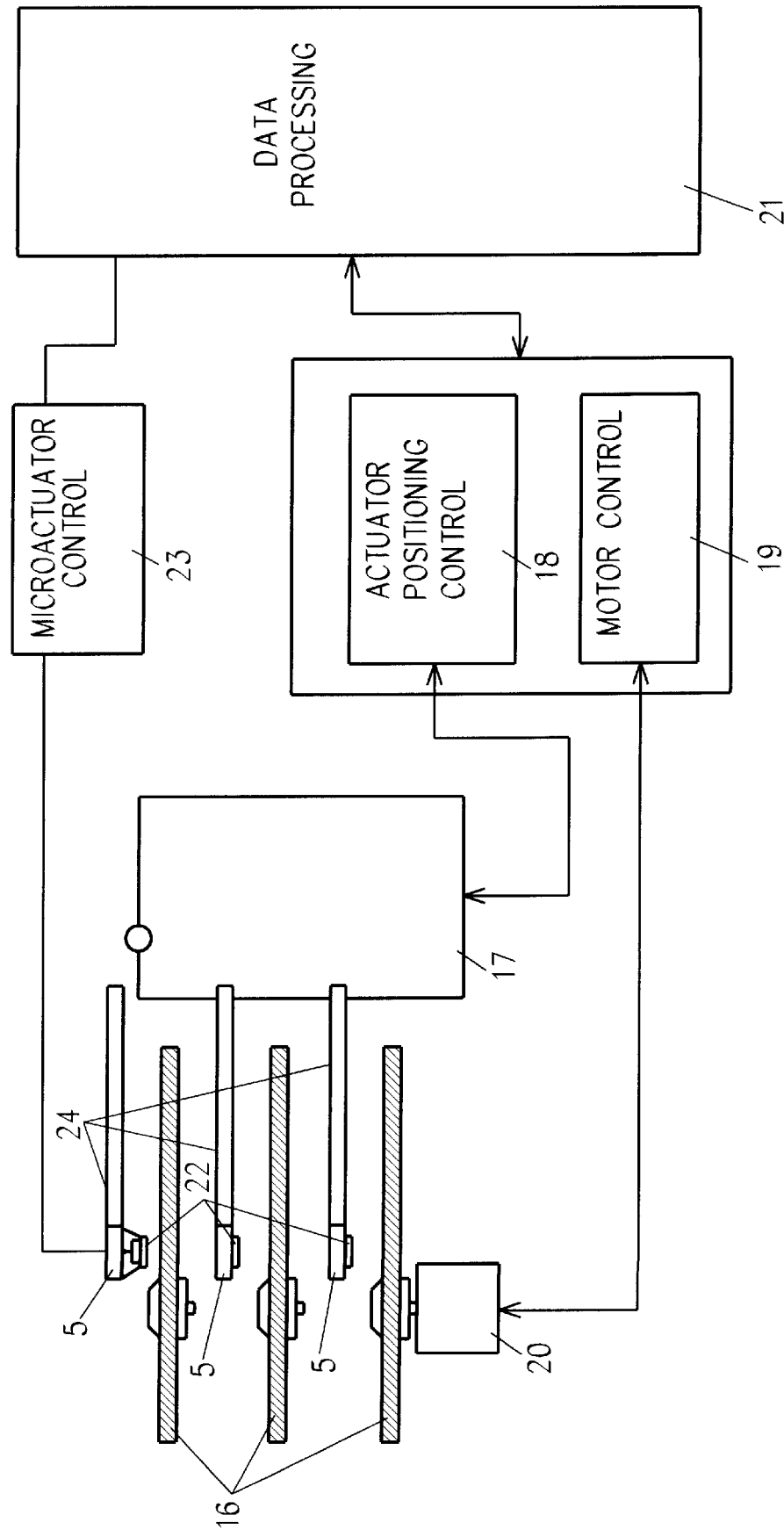
FIG. 8 illustrates the present invention incorporated into a disk drive.

FIG. 8 illustrates the layout of a disk drive. A plurality of disk platters 16 are centered on a common axis and rotated by a motor 20, a motor control 19 regulates the speed of rotation. A transducer 22 is located proximate to the surface of the disk platter supported by a slider 5 attached to an actuator arm 24 and positioned by an actuator 17. In one embodiment the transducer comprises a magnetic read/write head. The read/write head magnetically reads data from and writes data to data tracks formatted into a disk platter 16. The actuator is controlled by an actuator positioning control 18.

Another embodiment of the invention comprises an optical transducer reading data from an optical storage medium platter.

The present invention further positions the transducer with the use of a microactuator comprising a portion of the actuator arm. In this invention, an actuator comprises an actuator arm 24 supporting a load 3, said beam like element further supporting a microactuator mechanism 1. The microactuator mechanism 1 comprising a cradle supporting a beam like element 26 and at least two piezo crystals 6. The piezo crystals 6 are mounted in plane with the beam like element 26 and controlled via electrical connections to a microactuator control 23. The microactuator control can cause the piezo crystals to elongate or contract through use of electrical signals. Such elongation and contraction is used to micro-position the transducers over a data track.

Figure 1:
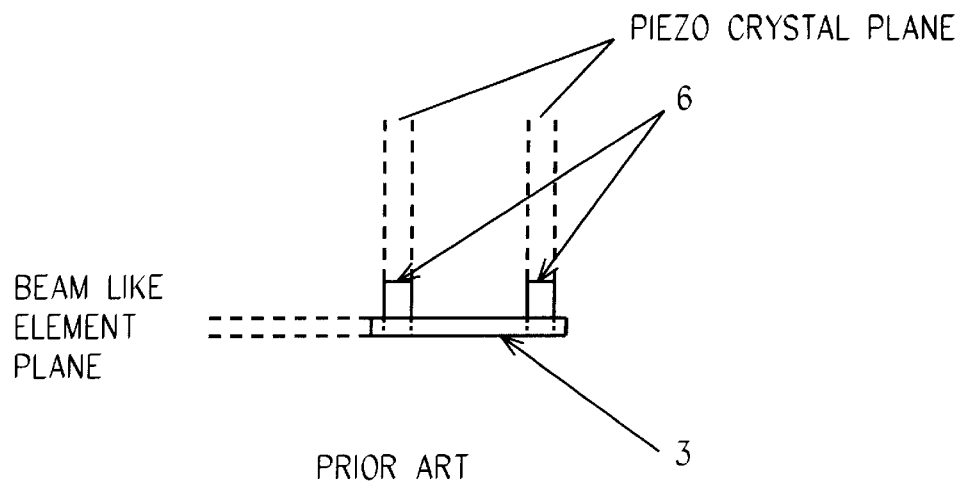
FIG. 1 is an illustration of the prior art design showing the piezo crystals at a 90° angle to the beam like element plane.
Figure 2:
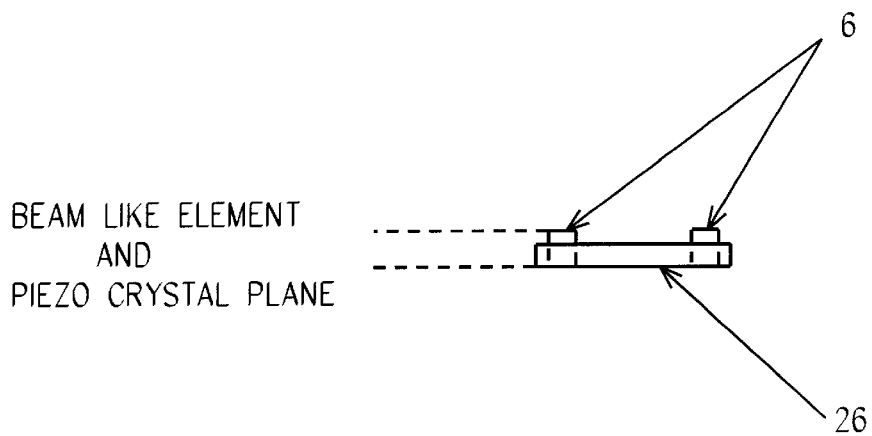
FIG. 2 is an illustration of the design of the present invention showing the piezo crystals in plane with the load beam.
Figure 3:
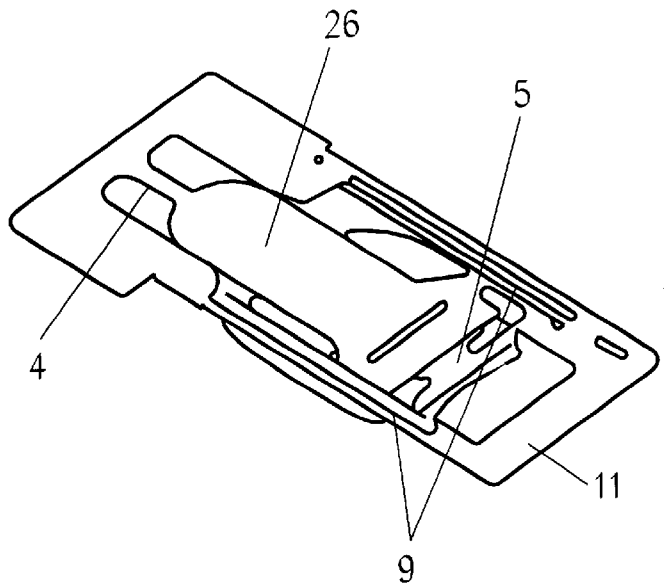
FIG. 3 illustrates a prior art load beam with the transducer mounted on the slider attached.
Figure 4:
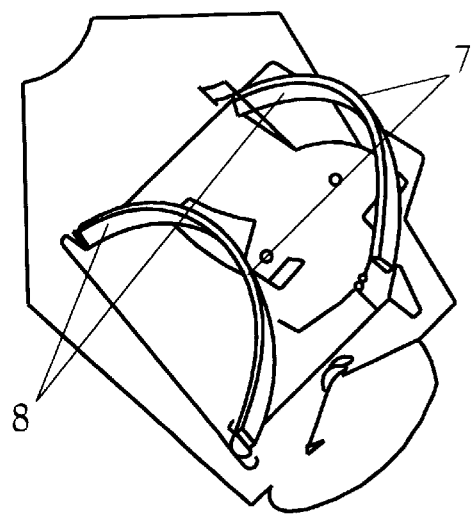
FIG. 4 illustrates the movement of the slider as the piezo crystals are actuated in the prior art design with the crystals mounted at 90° to the load beam plane.

FIG. 2 illustrates piezo crystals 6 mounted in the same plane as a beam like element 26. This drawing is in contrast to the illustration of prior art in FIG. 1 showing crystals 6 mounted perpendicular to a load beam 3. This invention utilizes crystals mounted in plane with the beam like element to effectuate a microactuator with improved sensitivity and size constraints. The design of this preferred embodiment enables a microactuator with a sufficiently low profile such that it can be used in many existing drives.

Figure 5:
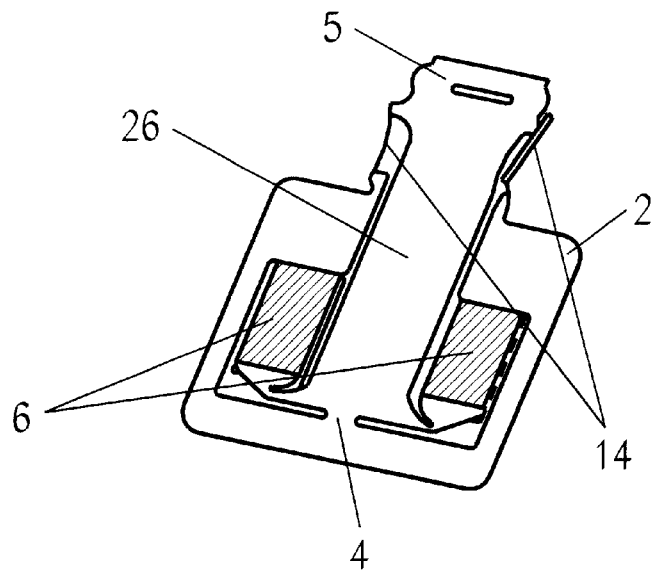
FIG. 5 illustrates the Walleye design of the present invention with the piezo crystals mounted in plane with the load beam.

FIG. 5 illustrates generally an actuator for a magnetic disk drive 1 comprising a microactuator mechanism with piezo crystals 6 in plane with a beam like element. The microactuator mechanism provides cross track motion when the crystals are activated. A preferred embodiment of the actuator includes two piezo crystals 6 fixedly mounted on a cradle 2 in a plane that is parallel, or close to parallel, to a load beam. The crystals may be mounted via an adhesive joint or other commonly known method. A beam like element 26 is attached to the cradle 2 by means of a living hinge 4. The living hinge 4 serves as a fulcrum about which the beam like element will pivot when a force is applied to the beam like element 26 by the crystals 6.

The beam like element 26 has a proximal end that is attached via the living hinge to the cradle 2, and a distal end that supports a slider 5. A flexure carrying the slider is typically welded to the beam like element. A transducer (not illustrated) is supported by and rigidly attached to the slider 5. Beam like element 26 can be fabricated from stainless steel or other resilient material in a conventional manner. The distal end of the beam like element is supported by two panels of the cradle 14.

Figure 6:
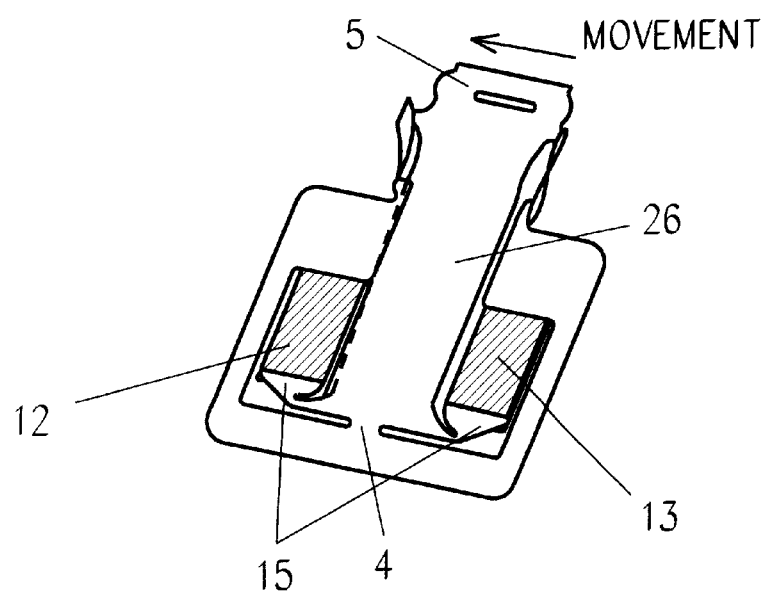
FIG. 6 illustrates the present invention with the crystals in an activated state causing the load arm to move.
Figure 7:
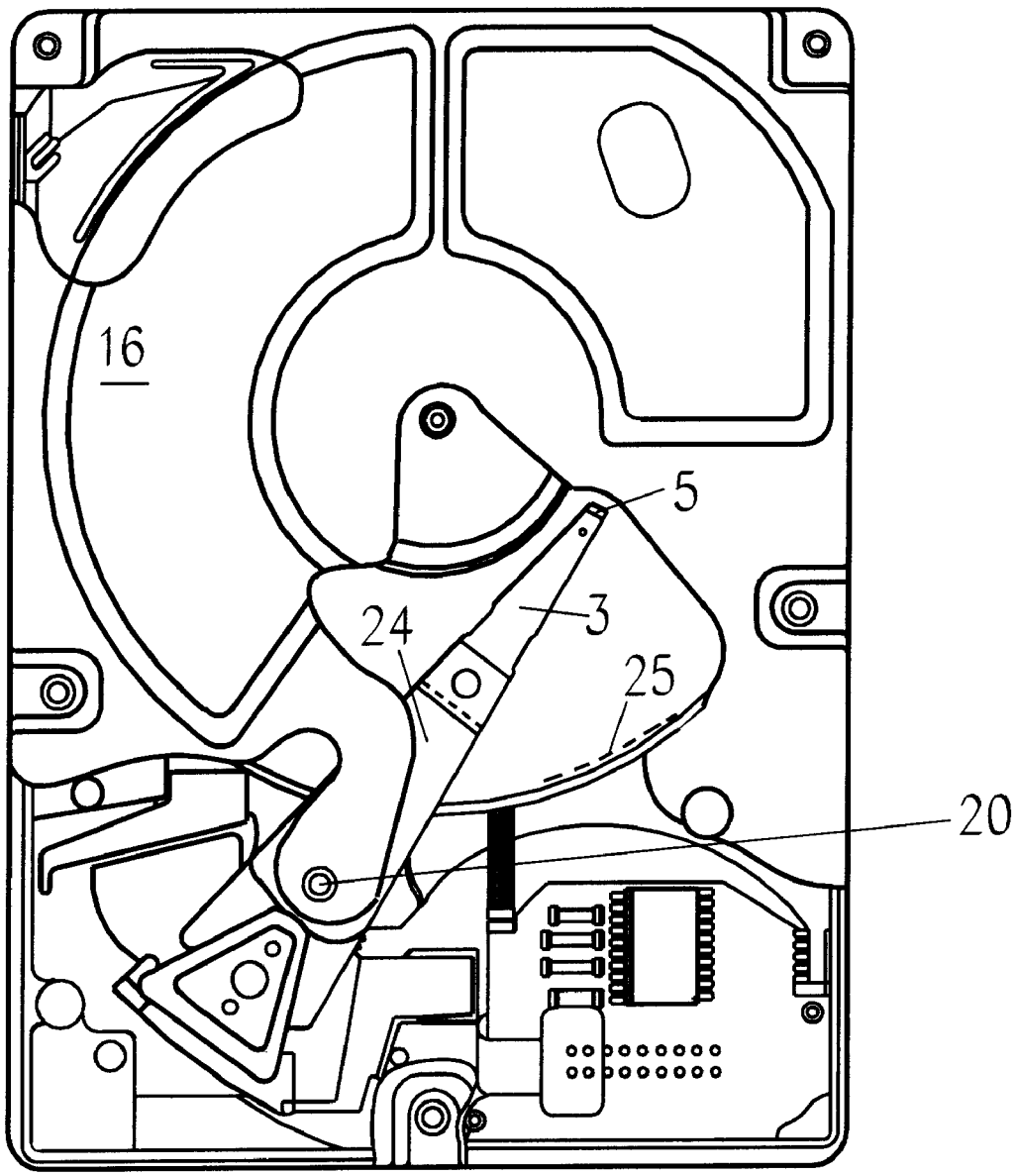
FIG. 7 illustrate a prior art layout of a disk drive.

The piezo crystals can be configured as either parallel or angled to each other. FIG. 5 and FIG. 6 illustrate the crystals in parallel to each other. However, structural or size considerations may make it desirable to angle the crystals towards each other such that if a line were extended from the ends closest together the lines would interesect. This can easily be accomplished with modification of the mounting surfaces on the panels of the cradle and the load beam. It is important, however, that the crystals remain in plane with the beam like element.

FIG. 6 illustrates how the crystals can act in unison to simultaneously exert extension force by one activated crystal 13 and compression force by the other activated crystal 12 on lever arms 15 formed at the proximal end of the beam like element. The linear forces generate a bending movement on the beam like element causing the beam like element to rotate about the living hinge 4 which acts as a fulcrum. Movement at the proximal end is amplified by the length of the beam like element. In this manner a relatively small linear motion of the crystals is converted into a greater rotatory movement of the distal end of the load arm. Although activation of one crystal unilaterally can cause movement in the beam like element, the unilateral movement may cause flexing of the beam like element and/or the cradle and is not a preferred embodiment.

Motion of the beam like element with flexure creates desired cross track motion of a read/write element mounted on the slider at the distal end of the load beam. There is a direct relationship between the length of the beam like element and resultant cross track motion. As the length of the beam like element increases, the cross track motion also increases for a given movement of the crystals.

Piezo crystals comprising a microelectronic machine are mounted on an area of the cradle that is in plane with a beam like element of a microactuator but are not mounted on the beam like element itself nor on the panels of the cradle. One advantage of not mounting the piezo crystals to these panels is that the panels can be mounted lower allowing the device to fit within existing height limits of current transducer suspensions.

In one preferred embodiment, referred to as the Walleye design and illustrated in FIG. 5 and FIG. 6, the microactuator MEM is located as close the slider as possible. In this manner, dynamic signatures between the actuator motor and the microactuator MEM may be distinguished and gain may be reduced that is associated with the first natural sway frequency. The Walleye design allows for the length of the beam like element to be considerably shorter than the length of a beam like element in previous designs, permitting cross track motion of the Walleye microactuator to be much more refined. In addition the parts in a Walleye design are relatively small, and the leveraged mass that the MEM must actuate is considerably decreased.

Computer simulations of the Walleye design indicate a decay rate of the asymptote, as the asymptote approaches infinity, to be less than 15 dB per decade meeting the safety margin of 5 dB less than 20 dB sought for today's disk drive designs. Further, the cross over frequency has been modeled at less than 1.6 Khz.

The total motion of the microactuator is limited by the resistance of its mechanical linkages. To achieve greatest motion, these linkages should offer minimal resistance, and still provide structural support. Such linkages are commonly known as "living" linkages. Lower resistance of these linkages also allows piezo crystals to extend and contract with minimal bending. In addition the living hinges tend to de-couple torsional vibrations and strain from the beam like element and piezo crystals increasing reliability.

The present invention incorporates a cradle design so that stresses caused by the movement of piezo crystals are confined to the living hinges. This degree of freedom is important as it prevents twisting of the adhesive joint between the cradle 2 and the piezo crystal 6. Excessive twisting at the bond lines will exceed the elastic limits of the adhesive and thus reduce the reliability of the microactuator.

Towards this end, it is preferable to have a supporting structure comprising two cradle panels 14 that are mounted perpendicular to the plane of the beam like element. Such cradle panels provide additional support the distal end of the beam like element connected to the slider. In addition, cradle panels perpendicular to the plane of the load beam like element are compliant in the cross track direction and posses high stiffness in the direction that is also perpendicular to the disk platter, herein defined as vertical. In the cross track direction, two cradle panels simply act as support beams that move with very low resistance. In the vertical direction, cradle panels support the gram load exerted via flexture and the load button. Typically, a load button must provide a gram load vertical force in the range of two to three grams to the slider in order to maintain proper air bearing dynamics.

This invention has been described in its presently contemplated best mode, and it is clear that it is susceptible to various modifications, modes of operation and embodiments, all within the ability and skill of those skilled in the art without the exercise of further inventive activity. Accordingly, what is intended to be protected by Letters Patent is set forth in the appended claims.

What is claimed is:

1. A microactuator for a disk drive comprising:
    a) a load beam supporting a microactuator mechanism;
        i) said microactuator comprising a cradle supporting a beam like element and two piezo crystals;
        ii) said beam like element having a proximal end and a distal end, with lever arms being formed into the proximal end, said beam like element additionally having a right side and a left side;
        iii) said beam like element being attached to said cradle at the proximal end via a living hinge and at the distal end via two cradle panels;
    b) a slider supported on the distal end of said beam like element, a transducer mounted on the slider; and
    c) two piezo crystals mounted in plane with said load beam and one crystal mounted on each side of said beam like element, each crystal having a proximal end and a distal end, the proximal ends of said crystals being attached to said lever arms formed into said beam like element and the distal end being attached via a bond line to the cradle, such that when one crystal is activated to compress and the other crystal is activated to elongate, the beam like element is caused to pivot about a fulcrum comprising the living hinge.

2. The microactuator of claim 1 wherein the piezo crystals are mounted in parallel to each other.

3. The microactuator of claim 1 wherein the piezo crystals are mounted such that they are angled toward each other.

4. The microactuator of claim 1 wherein a decay rate of an asymptote is less than 20 dB.

5. The microactuator mechanism of claim 1 wherein the piezo crystals are mounted via an adhesive joint to the cradle.

6. The microactuator of claim 1 wherein the piezo crystals are caused to elongate or contract through use of an electrical signal.

7. The microactuator of claim 1 wherein the slider is supported on the distal end of the beam like element via a flexure welded to the beam like element.

8. The microactuator mechanism of claim 1 wherein the beam like element is fabricated from stainless steel.

9. The microactuator mechanism of claim 1 wherein the cradle panels are mounted perpendicular to the beam like element.

10. The microactuator mechanism of claim 1 wherein the transducer comprises a magnetic read/write head.

11. A method for providing cross rack motion to a slider on a disk drive actuator arm comprising:
    a) providing a cradle supporting a beam like element and additionally supporting two piezo crystals, said beam like element having a proximal end and a distal end, with lever arms being formed into the proximal end, said beam like element additionally having a right side and a left side;
    b) attaching said beam like element to said cradle at the proximal end via a living hinge and at the distal end via two cradle panels;
    c) supporting a slider on the distal end of said beam like element, a transducer mounted on the slider;
    d) mounting two piezo crystals in plane with a load beam supporting said beam like element, one crystal being mounted on each side of said beam like element, each crystal having a proximal end and a distal end, the proximal ends of said crystals being attached to said lever arms formed into said beam like element and the distal end being attached via a bond line to the cradle; and
    e) activating one crystal to compress and the other crystal to elongate, thereby causing the beam like element to move around a fulcrum comprising the living hinge.

12. The method of claim 11 wherein the piezo crystals are mounted in parallel to each other.

13. The method of claim 11 wherein the piezo crystals are mounted such that they are angled towards each other.

14. The method of claim 11 wherein the piezo crystals are mounted via an adhesive joint to the cradle.

15. The method of claim 11 wherein the slider is supported on the distal end of beam like element via a flexure welded to the beam like element.

16. The method of claim 11 wherein the beam like element is fabricated from stainless steel.

17. The method of claim 11 wherein the cradles are formed perpendicular to the load beam.

18. The method of claim 11 wherein the transducer comprises a magnetic read/write head.

19. An apparatus for cross track positioning of a read/write element on a magnetic disk drive comprising:
    a) a means for supporting a beam like element, said beam like element additionally supporting a slider, said slider having a read/write element attached; and
    b) a means for pivoting said beam like element about a fulcrum attaching said beam like element to said means for supporting the beam like element, wherein the means for pivoting said beam like element remains in plane with the beam like element.

20. The apparatus for cross track positioning of a read/write element on a magnetic disk drive of claim 19 wherein:
    a) the means for supporting a beam like element is a cradle;
    b) said beam like element having a proximal end and a distal end, with lever arms being formed into the proximal end, said beam like element additionally having a right side and a left side;
    c) said beam like element being attached to said cradle at the proximal end via a living hinge and at the distal end via two cradle panels;
    d) a slider supported on the distal end of said beam like element with a transducer mounted on the slider; and
    e) a means for pivoting said beam like element about a fulcrum, said fulcrum comprising a living hinge.

* * * * *